(No Model.) 2 Sheets—Sheet 1.
G. LEVERICH.
FRICTION CLUTCH.
No. 426,567. Patented Apr. 29, 1890.
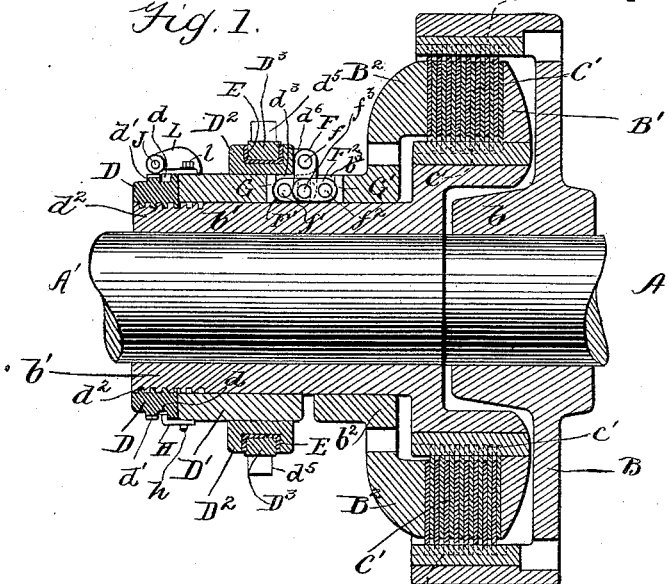
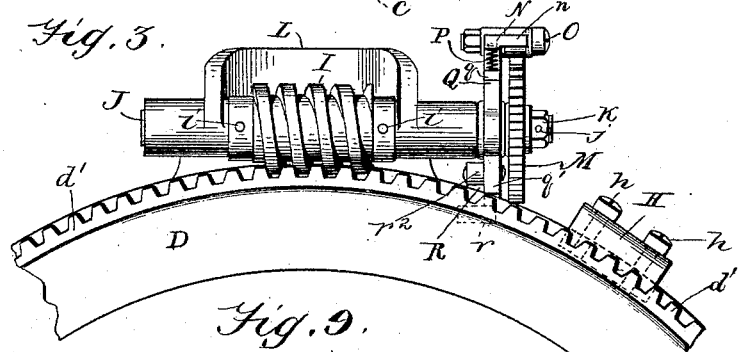
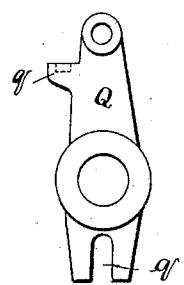
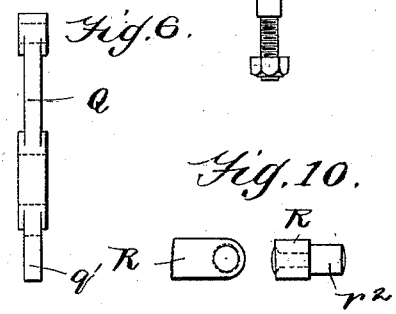
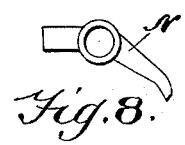
WITNESSES:
INVENTOR
Gabriel Leverich
BY
ATTORNEY.

(No Model.) 2 Sheets—Sheet 2.

G. LEVERICH.
FRICTION CLUTCH.

No. 426,567. Patented Apr. 29, 1890.

WITNESSES:
Frank S. Ober
Thomas K. Trenchard

INVENTOR
Gabriel Leverich
BY
W. J. Johnston
ATTORNEY.

UNITED STATES PATENT OFFICE.

GABRIEL LEVERICH, OF SOUTH ORANGE, NEW JERSEY.

FRICTION-CLUTCH.

SPECIFICATION forming part of Letters Patent No. 426,567, dated April 29, 1890.

Application filed January 18, 1890. Serial No. 337,355. (No model.)

*To all whom it may concern:*

Be it known that I, GABRIEL LEVERICH, a citizen of the United States, residing in South Orange, in the county of Essex and State of New Jersey, have invented certain new and useful Improvements in Friction-Clutches for Driving Machinery, of which the following is a specification.

In mechanism it is often necessary to connect an idle-shaft with another or driving shaft on the same line, or to disconnect them at will speedily and without shock. For this purpose a friction-clutch is sometimes employed composed of a number of thin annular metallic plates arranged in a series loosely on the shafts at or near their separation, one half the plates taken alternately being carried by the driving and the other half by the driven shaft. By suitable appliances these plates are pressed closely together or allowed to separate, whereby the shafts are connected or disconnected. As the power thereby transmitted is limited by the friction between the plane surfaces thus brought into contact, the pressure causing this friction must be a large multiple of the power acting through a short space. Therefore for effective operation frequent slight adjustments of the parts causing the pressure to restore their proper relative positions as the plates wear must be made. To perform this automatically and while the clutch is in use is the object of the improvement herein described.

Figure 4:
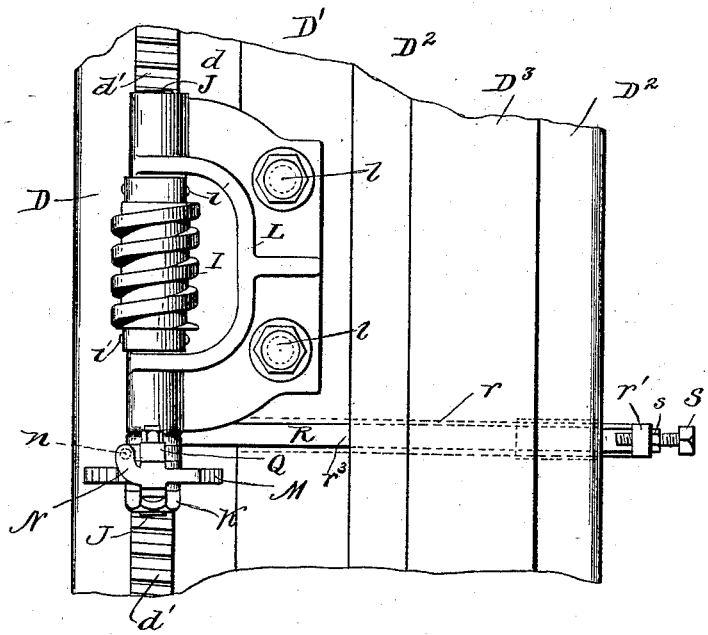
Figure 2:
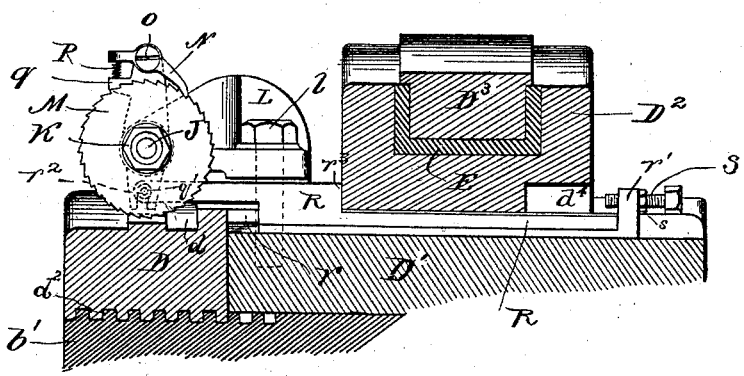

Accompanying and a part of this specification are these drawings, Figure 1, a longitudinal section of the friction-clutch connecting a driving and a driven shaft complete and closed; Figs. 2, 3, and 4, a longitudinal and a transverse elevation and a plan of the adjusting-gear; Figs. 5 and 6, a side and an edge elevation of the lever; Figs. 7 and 8, a plan and an elevation of the pawl, and Figs. 9 and 10 a view of the pawl-stud and of the sliding-bar stud.

One form of the friction-clutch referred to, and shown in Fig. 1, is described as follows: On the main or driving shaft A and keyed fast is the driving-disk B, with an outer cylindrical flange, which, with the long hub $b$, forms an annular chamber on the inner side. On the adjacent end of the driven shaft A' and keyed fast is the driven disk B', which projects into the annular chamber. Sliding on the elongated hub $b'$ of this disk and revolving with it is the compressing-disk B². These three disks are so shaped and located relatively to each other, as shown, that together they inclose an annular space, rectangular in radial section, in which the annular driving-plates C and the driven plates C' are placed alternately, and by means of the feathers $c$, dovetailed into the inner cylindrical surface of the driving-disk, and the feathers $c'$, dovetailed into the outer cylindrical surface of the driven disk, are carried by and revolved with these disks, respectively.

Screwed onto the outer end of hub $b'$ and traversing the square threads $d^2$ is the circular adjusting-nut D, against which the abutting ring D' bears. Surrounding this ring and moving longitudinally on it is the sliding ring D². These two rings and the nut revolve with the driven shaft. Between the adjoining ends of the compressing-disk and the abutting ring is an annular space, enlarged at equal annular distances apart, in which are three sets of toggles, each arranged as shown in Fig. 1, toggle F taking hold by pin $f$ of a lug $d^6$ on the side of the sliding ring, toggle F' by pin $f'$ of a lug $d^3$ on the end of the abutting ring, and toggle F² by pin $f^2$ of a lug $b^3$ on the end of the compressing-disk, the free ends of these toggles being united by the pin $f^3$. To relieve pins $f'$ and $f^2$ from too great pressure, the bearing-blocks G and G' are inserted at the outer ends of toggles F' and F². In an external circular groove around the sliding ring and supported by the wearing-blocks E is the trunnion-ring D³. This ring does not revolve. It has two trunnions $d^5$, placed opposite each other, to which is attached a forked lever or other appliance, whereby in operating the clutch the trunnion and sliding rings D³ and D² are moved longitudinally to the right or left along the abutting ring D'. The toggles F' and F² are thrown in or drawn out, and the plates C and C' are pressed together or allowed to separate, thus closing or opening the clutch and connecting or disconnecting the two shafts. It will be seen that by this arrangement, except when the friction-clutch is closed and the pressure on the plates is sufficient to cause the shafts to revolve together, there must be slipping between the adjoining plate-surfaces and consequent wear proportionate to the pressure and the difference of speed of the two shafts, and that the range of longitudinal movement of the compressing-disk is much less than that of the trunnion-ring, the ratio between them decreasing rapidly as the toggles $F^2$ and $F'$ approach a straight line, at which position the pressure is maximum, whence also it is necessary for the efficient operation of the clutch that whatever the wear of the plate-surfaces may be when it is closed, with the toggles nearly in a straight line, the friction resulting from the pressure thus imposed on the plates shall be sufficient to prevent slipping between their surfaces. To effect this the adjusting-ring must from time to time be rotated on its threads, whereby the abutting and sliding rings and the compressing-disk will be moved longitudinally toward the driving-disk a space equal to the aggregate reduction by wear in thickness of the plates.

The appliance for making this adjustment as required automatically is described as follows: On the outer cylindrical surface of the adjusting-nut D is the fine-toothed worm-wheel $d'$, with which the screw I, fastened by the pins $i$ on the shaft J, engages. This shaft revolves in the frame L, attached by the tap-bolts $l$ to the outer cylindrical surface of the abutting ring $D'$. Fixed by the nut K on one end of this shaft is the ratchet-wheel M. Adjoining this wheel and loosely oscillating on this shaft is the lever Q. At the inner end of this lever is the fork $q'$, and at the outer end on the screw-stud O is the pawl N, which traverses the teeth of the ratchet-wheel, and is kept in contact therewith as the clutch and shaft revolve by the spiral spring P, interposed between the lug $n$ of the pawl and the lug $q$ of the lever, a circular recess in each lug being made to receive the ends of the spring. Inserted in a dovetail longitudinal groove $r$, cut into the outer surface of the abutting ring, is the dovetail sliding bar R. At the outer end of this bar is the stud $r^2$, which is embraced by the fork $q'$ of the lever Q, and at the inner end is the lug $r'$, into which the adjusting-screw S is threaded and locked fast by the nut $s$. A recess $d^4$ opposite the adjusting-screw in the inner end of the sliding ring permits the latter, when moved toward the plates, to pass part way over the screw before the inner wall of the recess comes into contact with it, and when the ring is moved from the plates it will before reaching the limit come into contact with the shoulder $r^3$ of the sliding bar.

To rotate the screw and adjusting-nut by hand, a wrench is put on the nut K, said nut K being prevented from turning on the shaft J by the pin $j$. In order that the abutting ring and connected parts may follow the adjusting-nut when the latter is turned from the plates, three keepers H are by tap-screws $h$ attached to the abutting ring at equal angular distances apart, and each by a lug at its free end takes into the annular groove $d$ around the adjusting-nut, thus serving to maintain a close contact between the latter and the abutting ring.

The range of movement of the sliding ring when the clutch is closed is such that the toggles $F^2$ and $F'$ are thrown into one straight line outward, and when the clutch is open the said ring moves a distance in excess of that necessary to allow the plates, each from the other, to completely separate, and thus the sliding bar K must move to cause the pawl to traverse one or more teeth of the ratchet-wheel, the screw S being adjusted to effect this. In operating the clutch it will ordinarily be necessary to move the sliding ring so far only that when the compressing-disk $B^2$ is moved to close the clutch and the toggles are nearly or quite in a straight line the plates slip. Then by throwing the ring to its outer limit the ratchet-wheel will be rotated one or more teeth, and consequently the adjusting-nut traverses its threads and forces the abutting ring and connected parts toward the plates, so that when the clutch is again closed the toggles will be in a position for effective action. If in any case, however, it is deemed best to bring the sliding ring to a certain outward position in operating the clutch, the sliding bar may be so adjusted that if the toggles approach too nearly to a straight line when the clutch is closed, upon opening it the adjusting-nut will be rotated and the toggles brought to a new position. It is to be noticed that this rotation and change of position takes place when there is no pressure on the parts moved.

Having thus described my invention, I claim—

1. The combination, with two members of a friction-clutch, one of which is a moving element accomplishing by its movements the locking or unlocking of the clutch, of mechanism controlled by the wear of the parts and acting during the operation of the clutch for imparting to said moving element an extra movement compensating for said wear of the parts, substantially as and for the purpose set forth.

2. The combination, with two members of a friction-clutch, one having a motion to and from the other, of a system of toggles for accomplishing said to-and-fro movement, an adjustable abutment determining the position of the movable member, the toggles being connected with the abutment and with the movable member, and mechanism for adjusting said abutment to compensate for wear of the clutch, said mechanism being automatically operated by the connections of the said movable member.

3. The combination, with two members of a friction-clutch, one having a motion to and from the other, of a system of toggles for accomplishing said to-and-fro movement, an adjustable abutment determining the position of the movable member, the toggles being connected with the abutment and with the movable member, mechanism for adjusting said abutment to compensate for wear of the clutch, and connections for automatically operating the said mechanism when the toggles are moved to open the clutch.

4. The combination, with the plates C and C' and the hub $b'$, provided with disk B', of the pressure-disk $B^2$, mounted to slide on the hub $b'$, the abutting ring D', and a system of toggles connecting disk $B^2$ and ring D' and moving the disk $B^2$, a sliding ring operating the toggles and adapted to partake of an abnormal movement due to the wear of the clutch, and mechanism controlled by such abnormal movement for automatically adjusting the parts of the clutch to compensate for said wear, substantially as described.

5. The combination of hub $b'$, provided with disk B', the pressure-disk $B^2$, and the plates C and C' between said disks, the abutting ring connected with the pressure-disk by a system of toggles, the sliding ring $D^2$ for operating the toggles, the adjusting-nut D, provided with gear $d'$, the worm I, working in said gear, and mechanism connecting the worm with the sliding ring $D^2$, whereby abnormal movements of the ring will effect the rotation of the worm, the adjustment of the nut D, and a movement of the parts to prevent such abnormal movement of ring $D^2$, substantially as described.

6. The combination of abutting ring D', adjusting-nut D, provided with gear $d'$, the sliding ring $D^2$, accomplishing by its movement the locking and unlocking of a clutch, a reciprocating bolt, as R, arranged to be moved by the ring $D^2$ whenever said ring partakes of an abnormal movement, a pawl and ratchet operated by said bolt, and a worm I, meshing with gear $d'$ and operated by said pawl and ratchet, for the purpose set forth.

In witness whereof I have hereunto signed my name in the presence of two subscribing witnesses.

GABRIEL LEVERICH.

Witnesses:
   WM. A. ROSENBAUM,
   THOMAS K. TRENCHARD.